United States Patent
Tozu et al.

(10) Patent No.: US 6,278,929 B1
(45) Date of Patent: Aug. 21, 2001

(54) VEHICLE MOTION CONTROL SYSTEM

(75) Inventors: Kenji Tozu, Yokkaichi; Takayuki Itoh, Ichinomiya, both of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/427,115

(22) Filed: Oct. 26, 1999

(30) Foreign Application Priority Data

Oct. 30, 1998 (JP) .................................................. 10-325969

(51) Int. Cl.⁷ ............................................................ G06F 7/70
(52) U.S. Cl. .................................. 701/70; 701/36; 701/78; 701/83; 303/155; 303/166; 303/167
(58) Field of Search ................................ 701/70, 36, 37, 701/38, 41, 71, 78, 79, 72, 83; 303/116.1, 113.2, 140, 146, 10, 163, 166, 174, 147, 188, 155, 167; 180/197

(56) References Cited

U.S. PATENT DOCUMENTS

| | | | |
|---|---|---|---|
| 5,620,239 | * | 4/1997 | Mihara et al. .......................... 303/121 |
| 5,752,752 | * | 5/1998 | Tozu et al. .............................. 303/146 |
| 5,762,406 | * | 6/1998 | Yasui et al. ............................. 303/146 |
| 5,857,754 | * | 1/1999 | Fukami et al. .......................... 303/146 |
| 5,913,578 | * | 6/1999 | Tozu et al. .............................. 303/140 |
| 5,927,830 | * | 7/1999 | Tozu et al. .............................. 303/155 |
| 6,053,583 | * | 4/2000 | Izumi et al. ............................. 303/150 |
| 6,070,952 | * | 6/2000 | Tozu et al. .............................. 303/146 |
| 6,078,858 | * | 6/2000 | Tozu et al. .............................. 701/79 |
| 6,106,080 | * | 8/2000 | Tozu et al. .......................... 303/116.1 |

FOREIGN PATENT DOCUMENTS

| | | |
|---|---|---|
| 5-314397 | 11/1993 | (JP) . |
| 8-142846 | 6/1996 | (JP) . |
| 9-301147 | 11/1997 | (JP) . |
| 10-282138 | 10/1998 | (JP) . |

\* cited by examiner

*Primary Examiner*—Jacques H. Louis-Jacques
(74) *Attorney, Agent, or Firm*—Burns, Doane, Swecker & Mathis, LLP

(57) ABSTRACT

The present invention is directed to a vehicle motion control system, which includes a hydraulic braking pressure control apparatus for controlling braking force applied to each wheel of a vehicle at least in response to depression of a brake pedal. A vehicle condition monitor is disposed in the vehicle for monitoring a condition of the vehicle in motion, and a vehicle condition determining device is provided for determining stability of the vehicle in motion, including a turning motion of the vehicle on the basis of the output of the monitor. A braking force controller is provided for controlling the pressure control apparatus in response to the result of determination of the vehicle condition determining device to control the braking force applied to each wheel of the vehicle. A starting reference setting device is provided for setting a starting reference to start the braking force control by the braking force controller in response to the result of determination of the vehicle condition determining device. Then, an error estimating device is provided for estimating an error caused by the monitor, and a correction device is provided for correcting the starting reference set by the starting reference setting device in response to the error estimated by the error estimating device.

9 Claims, 9 Drawing Sheets

VEHICLE MOTION CONTROL SYSTEM

This application claims priority under 35 U.S.C. Sec. 119 to No.10-325969 filed in Japan on Oct. 30, 1998, the entire content of which is herein incorporated by reference.

BACKGROUND OF THE INVENTION

1. Field of the Invention

The present invention relates to a vehicle motion control system for controlling motion of a vehicle, and more particularly to the control system for maintaining vehicle stability by controlling a braking force applied to each wheel of the vehicle irrespective of depression of a brake pedal in the vehicle motion including a turning motion of the vehicle.

2. Description of the Related Arts

As a system for controlling a vehicle motion characteristic, especially a turning characteristic of the vehicle, an apparatus for controlling a difference between the braking force applied to right and left wheels to directly control a turning moment has been noted, and it is now on the market. For example, Japanese Patent Laid-open Publication No.9-301147 discloses a motion control apparatus which estimates an amount indicative of a condition of the vehicle in motion when the vehicle turns, and controls a hydraulic braking pressure control apparatus so as to correct a yaw moment of the vehicle to make the vehicle in motion to be stable, when the amount indicative of the condition of the vehicle in motion exceeded a threshold level for starting the control. In that publication, in order to change a range of the amount of the vehicle motion for starting the control in accordance with a coefficient of friction, is proposed the motion control apparatus, wherein the lower the coefficient of friction is, the smaller the threshold level for starting the control is set.

In the vehicle motion control system as described above, various sensors for detecting signals indicative of the condition of the vehicle in motion have been disposed. For example, Japanese Patent Laid-open Publication No.5-314397 discloses a yaw rate sensor for detecting a yaw rate of the vehicle. In this Publication, a zero point signal of the yaw rate sensor is renewed to provide such a relationship that each of positive or negative value of steering angle within a certain time period and each of positive or negative value of yaw rate within a certain time period will coincide with each other, under a certain running condition of the vehicle.

According to the apparatus for processing the sensor signal as described in the Publication No.5-314397, the renewal of the zero point may cause an error, when controlling the vehicle motion. Therefore, it is preferable not to start the vehicle motion control, when the zero point is renewed. In an apparatus having a lateral acceleration sensor for detecting the lateral acceleration of the vehicle, the center of gravity of the vehicle moves, when the vehicle runs on a rough road, for example, so that a distance will be made between the center of gravity and a position of the vehicle on which the center of the sensor is mounted, to cause an error in the detected lateral acceleration. In practice, an actual acceleration (Gyo) is calculated in accordance with the following equation:

$$Gyo = Gya - L \cdot d\gamma/dt$$

where "Gya" is a value detected by the lateral acceleration sensor, "L" is the distance between the center of gravity and the position of the vehicle on which the center of the sensor is mounted, and "γ" the yaw rate. Thus, the error of $(L \cdot d\gamma/dt)$ is caused. In particular, when a vehicle slip angle for use in a steering control by braking is calculated, the error in the output of the lateral acceleration sensor is accumulated, thereby to cause a relatively large error. Therefore, it is preferable to set a gain for starting the control to be less sensitive, such that the vehicle motion control will not start, when the error caused by the lateral acceleration sensor is estimated.

In the motion control apparatus as disclosed in the Publication No.9-301147, the threshold level for starting the control is corrected in response to the coefficient of friction of the road, but it is not corrected in advance by estimating the error caused by a monitor like the sensor as described above.

SUMMARY OF THE INVENTION

Accordingly, it is an object of the present invention to provide a vehicle motion control system for setting an appropriate starting reference for a vehicle motion control, without being influenced by an error caused by a monitor, to smoothly control the vehicle in motion to be stable.

In accomplish the above and other objects, the vehicle motion control system is arranged to include a hydraulic braking pressure control apparatus which is adapted to control braking force applied to each wheel of the vehicle at least in response to depression of a brake pedal, a vehicle condition monitor which is disposed in the vehicle to monitor a condition of the vehicle in motion, a vehicle condition determining device which is adapted to determine stability of the vehicle in motion, including a turning motion of the vehicle on the basis of the output of the monitor, and a braking force controller which is adapted to control the hydraulic braking pressure control apparatus in response to the result of determination of the vehicle condition determining device to control the braking force applied to each wheel of the vehicle. A starting reference setting device is provide for setting a starting reference to start the braking force control by the braking force controller in response to the result of determination of the vehicle condition determining device. Then, an error estimating device is provided for estimating an error caused by the monitor, and a correction device is provided for correcting the starting reference set by the starting reference setting device in response to the error estimated by the error estimating device.

In the vehicle motion control system, the correction device is preferably adapted to correct the starting reference set by the starting reference setting device to be relatively higher, when the error estimating device estimated the error resulted from a distance between the center of gravity of the vehicle and the center of the monitor mounted on the vehicle. The correction device may be adapted to correct the starting reference set by the starting reference setting device to be relatively higher, when the error estimating device estimated the error resulted from a zero point set for the monitor. Or, the correction device may be adapted to correct the starting reference set by the starting reference setting device to be relatively higher, when the error estimating device estimated the error resulted from inclination of the vehicle in a lateral direction thereof.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENT

Figure 1:
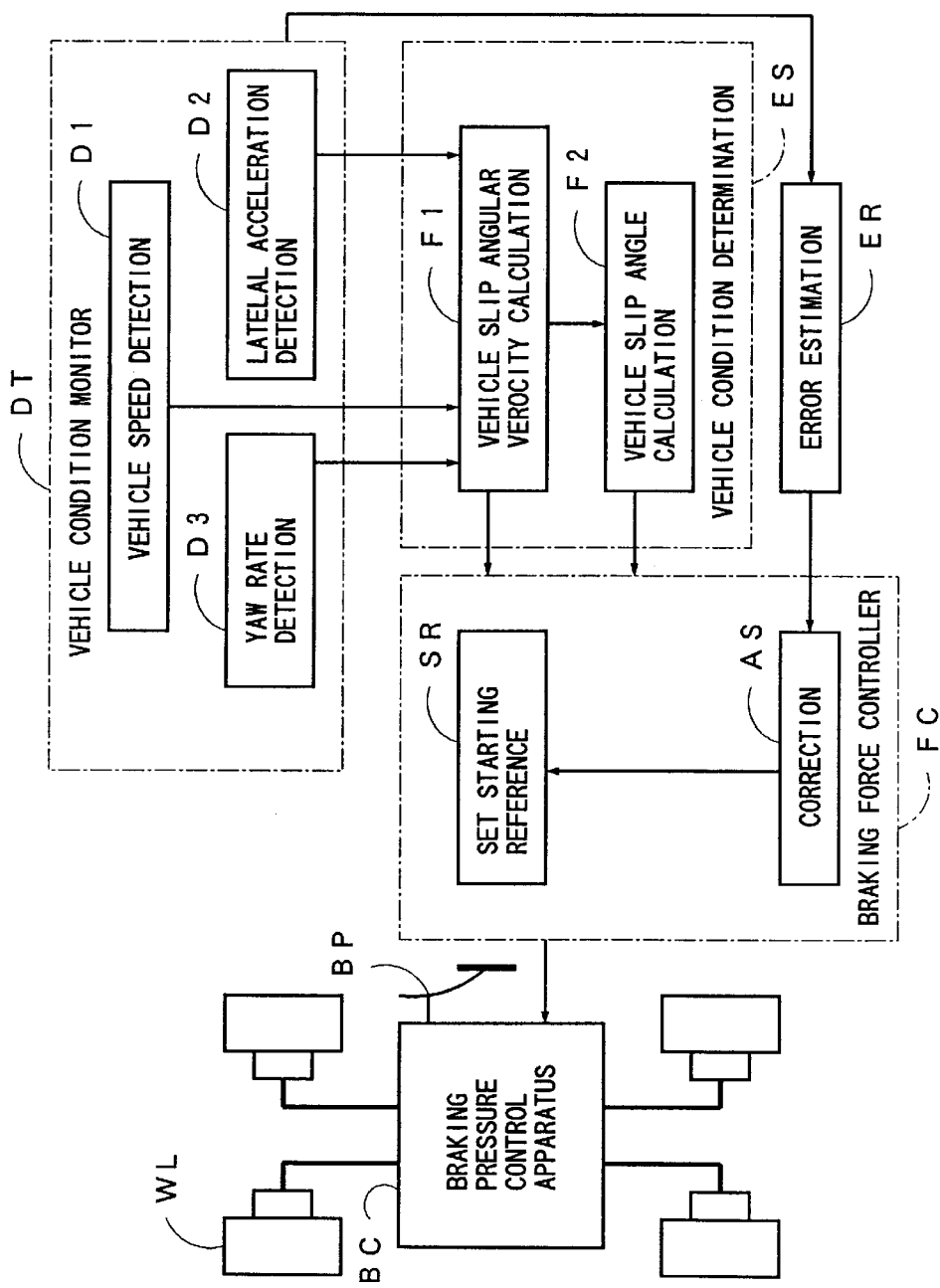
FIG. 1 is a block diagram illustrating an embodiment of a vehicle motion control system according to the present invention.

Referring to FIG. 1, there is schematically illustrated a vehicle motion control system according to an embodiment of the present invention. The system includes a hydraulic braking pressure control apparatus BC which is adapted to control braking force applied to each wheel WL of a vehicle at least in response to depression of a brake pedal BP, a vehicle condition monitor DT which is disposed in the vehicle for monitoring a condition of the vehicle in motion, a vehicle condition determining device ES for determining stability of the vehicle in motion, including a turning motion of the vehicle on the basis of the output of the monitor DT, and a braking force controller FC which is adapted to control the hydraulic braking pressure control apparatus BC in response to the result of determination of the vehicle condition determining device ES to control the braking force applied to each wheel of the vehicle. The controller FC includes a starting reference setting device SR, which is adapted to set a starting reference to start the braking force control by the braking force controller FC in response to the result of determination of the vehicle condition determining device ES. Furthermore, an error estimating device ER is provided for estimating an error caused by the monitor DT, and a correction device AS which is adapted to correct the starting reference set by the starting reference setting device SR in response to the error estimated by the error estimating device ER.

According to the present embodiment, the vehicle condition monitor DT includes a vehicle speed detecting device D1 for detecting a vehicle speed, a lateral acceleration detecting device D2 for detecting a lateral acceleration of the vehicle, and a yaw rate detecting device D3 for detecting a yaw rate of the vehicle. The vehicle condition determining device ES includes a vehicle slip angular velocity calculating device F1 which is adapted to calculate a vehicle slip angular velocity on the basis of the vehicle speed detected by the vehicle speed detecting device D1, the lateral acceleration detected by the lateral acceleration detecting device D2, and the yaw rate detected by the yaw rate detecting device D3, and a vehicle slip angle calculating device F2 which is adapted to integrate the vehicle slip angular velocity to obtain a vehicle slip angle. Accordingly, the starting reference setting device SR is adapted to set the starting reference in response to the result calculated by the vehicle slip angular velocity calculating device F1, and the result calculated by vehicle slip angle calculating device F2. Then, according to the correction device AS, is corrected a component of the result calculated by the vehicle slip angular velocity calculating device F1 out of components of the starting reference set by the starting reference setting device SR, as will be explained later in detail, with reference to FIG. 5.

Figure 2:
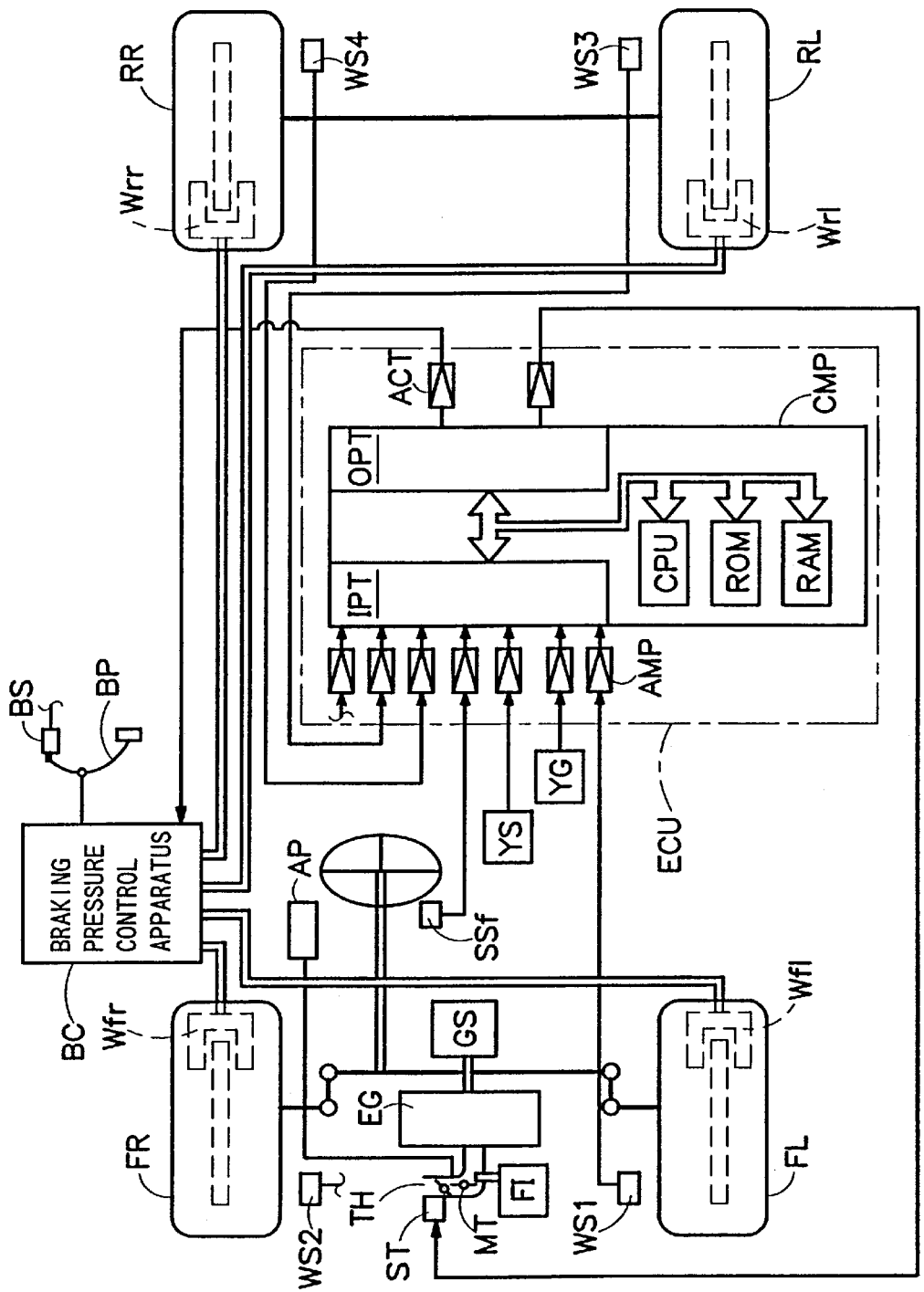
FIG. 2 is a schematic block diagram of a vehicle having a vehicle motion control system according to an embodiment of the present invention.

FIG. 2 illustrates a vehicle having the vehicle motion control system as described above. The vehicle has an engine EG provided with a fuel injection apparatus FI and a throttle control apparatus TH which is arranged to control a main throttle opening of a main throttle valve MT in response to operation of an accelerator pedal AP. The throttle control apparatus TH has a sub-throttle valve ST which is actuated in response to an output signal of an electronic controller ECU to control a sub-throttle opening. Also, the fuel injection apparatus FI is actuated in response to an output signal of the electronic controller ECU to control the fuel injected into the engine EG. According to the present embodiment, the engine EG is operatively connected with the front wheels FL, FR through a transmission GS to provide a front-drive system, but the present embodiment is not limited to the front-drive system. The wheel FL designates the wheel at the front left side as viewed from the position of a driver's seat, the wheel FR designates the wheel at the front right side, the wheel RL designates the wheel at the rear left side, and the wheel RR designates the wheel at the rear right side.

Figure 12:
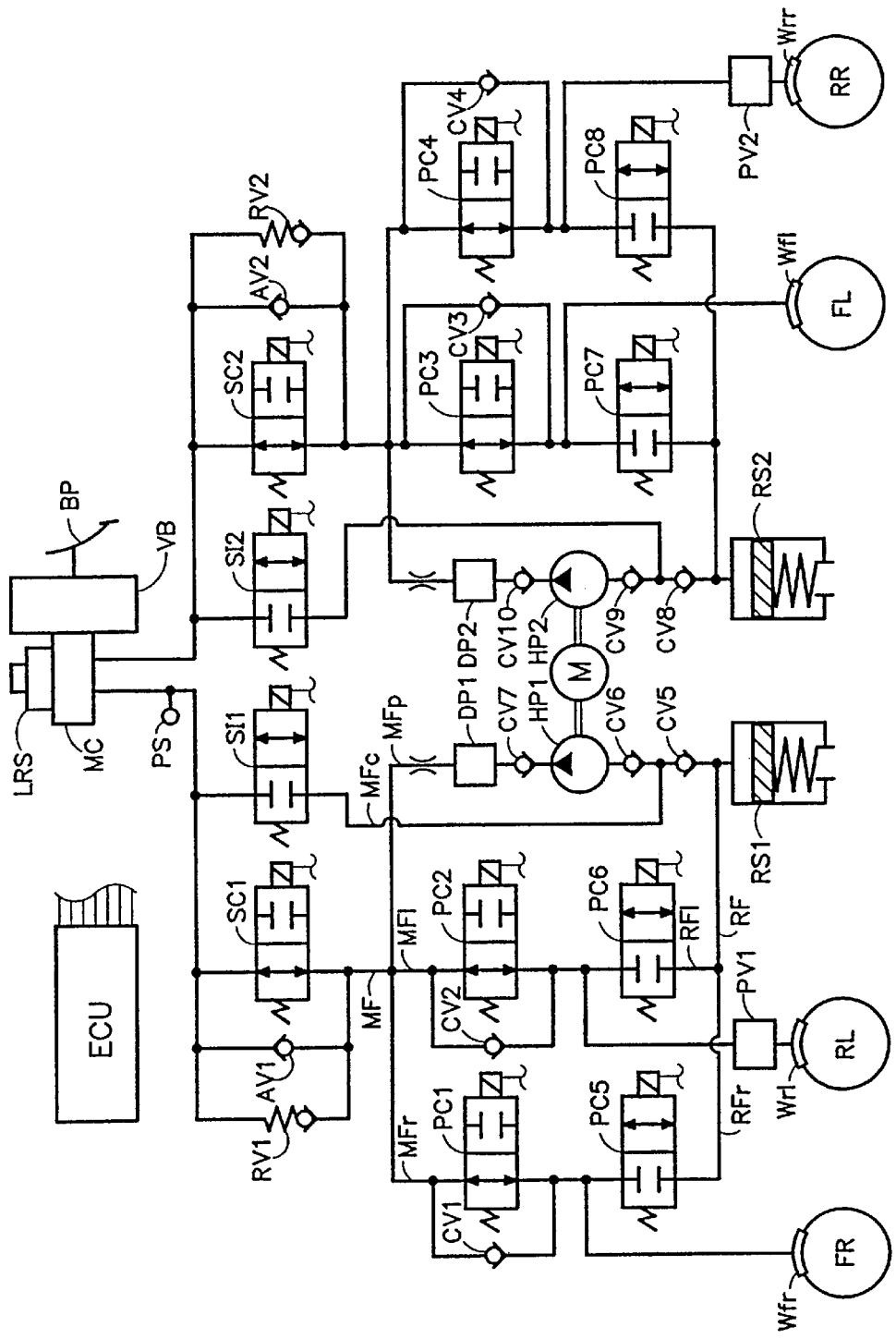
FIG. 12 is a schematic block diagram of a hydraulic pressure circuit for use in a vehicle motion control system according to an embodiment of the present invention.

With respect to a braking system according to the present embodiment, wheel brake cylinders Wfl, Wfr, Wrl, Wrr are operatively mounted on the wheels FL, FR, RL, RR of the vehicle, respectively, and which is fluidly connected to a hydraulic braking pressure control apparatus BC. The pressure control apparatus BC in the present embodiment may be arranged as illustrated in FIG. 12 which will be explained later in detail. According to the present embodiment, a so-called diagonal circuit system has been employed.

As shown in FIG. 2, at the wheels FL, FR, RL and RR, there are provided wheel speed sensors WS1 to WS4 respectively, which are connected to the electronic controller ECU, and by which a signal having pulses proportional to a rotational speed of each wheel, i.e., a wheel speed signal is fed to the electronic controller ECU. There are also provided a brake switch BS which turns on when the brake pedal BP is depressed, and turns off when the brake pedal BP is released, a front steering angle sensor SSf for detecting a steering angle θ f of the front wheels FL, FR, a lateral acceleration sensor YG for detecting a vehicle lateral acceleration, and a yaw rate sensor YS for detecting a yaw rate of the vehicle. These are electrically connected to the electronic controller ECU.

As shown in FIG. 2, the electronic controller ECU is provided with a microcomputer CMP which includes a central processing unit or CPU, a read-only memory or ROM, a random access memory or RAM, an input port IPT, and an output port OPT, and etc. The signals detected by each of the wheel speed sensors WS1 to WS4, brake switch BS, front steering angle sensor SSf, yaw rate sensor YS and lateral acceleration sensor YG are fed to the input port IPT via respective amplification circuits AMP and then to the central processing unit CPU. Then, control signals are fed from the output port OPT to the throttle control apparatus TH and hydraulic braking pressure control apparatus BC via the respective driving circuits ACT. In the microcomputer CMP, the read-only memory ROM memorizes a program corresponding to flowcharts as shown in FIGS. 3 to 6, the central processing unit CPU executes the program while the ignition switch (not shown) is closed, and the random access memory RAM temporarily memorizes variable data needed to execute the program. A plurality of microcomputers may be provided for each control such as throttle control, or may be provided for performing various controls, and electrically connected to each other.

Figure 3:
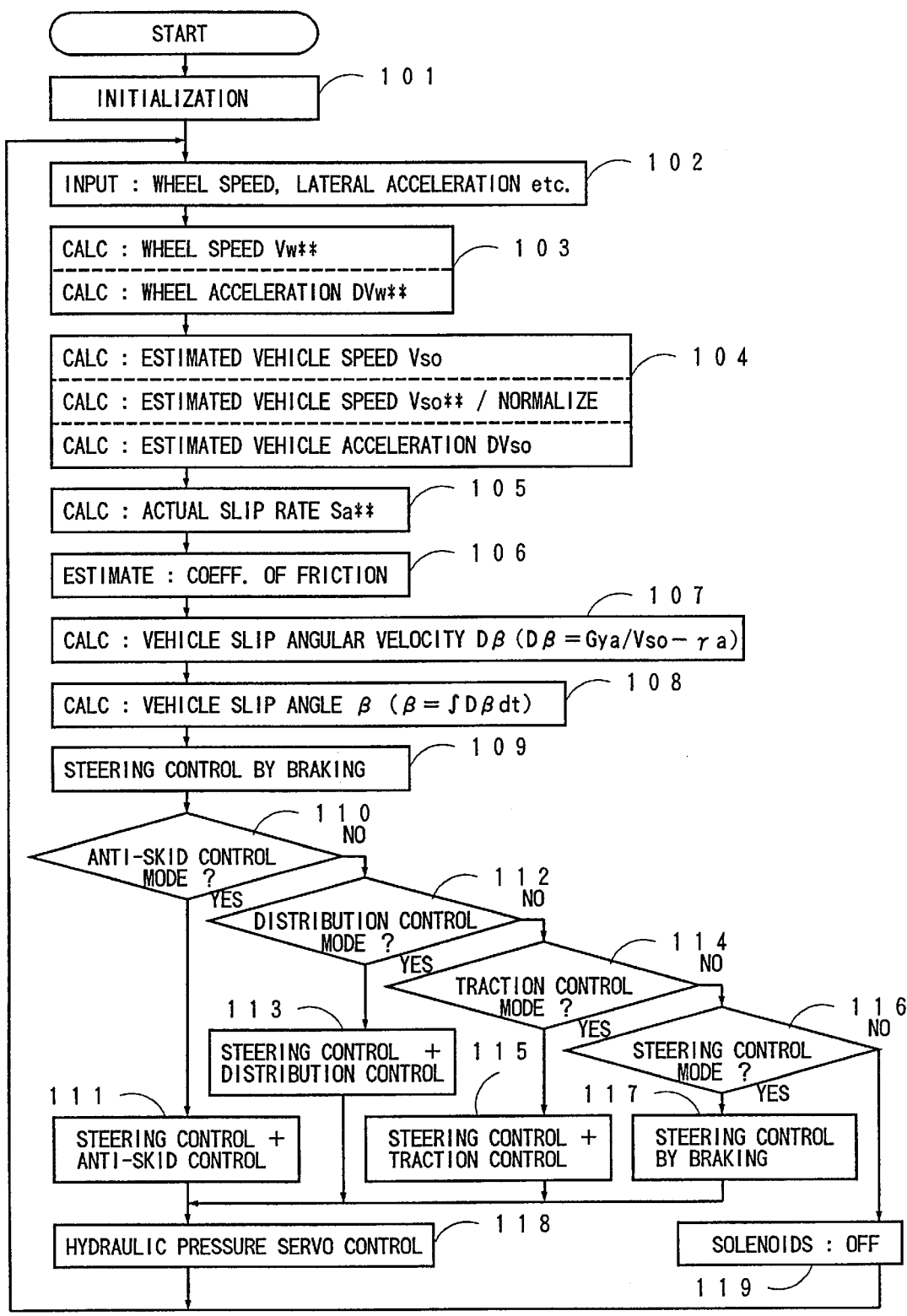
FIG. 3 is a flowchart showing a main routine of the brake control according to an embodiment of the present invention.

According to the present embodiment as constituted above, a program routine for the vehicle motion control including the steering control by braking, anti-skid control and so on is executed by the electronic controller ECU, as will be described hereinafter with reference to FIGS. 3 to 6. The program routine starts when an ignition switch (not shown) is turned on. At the outset, the program for the brake control as shown in FIG. 3 provides for initialization of the system at Step 101 to clear various data. At Step 102, the signals detected by the wheel speed sensors WS1 to WS4 are read by the electronic controller ECU, and also read are the signal (steering angle θf) detected by the front steering angle sensor SSf, the signal (actual yaw rate γa) detected by the yaw rate sensor YS, and the signal (actual lateral acceleration Gya) detected by the lateral acceleration sensor YG.

Then, the program proceeds to Step 103 where the wheel speed Vw ( represents one of the wheels FL, FR, RL, RR) of each wheel is calculated, and differentiated to provide the wheel acceleration DVw. At Step 104, the maximum of the wheel speeds Vw for four wheels is calculated to provide an estimated vehicle speed Vso on the center of gravity of the vehicle (Vso=MAX[Vw]), and an estimated vehicle speed Vso is calculated for each wheel, respectively, on the basis of the wheel speed Vw. The estimated vehicle speed Vso may be normalized to reduce an error caused by a difference between the wheels located on the inside and outside of the curve while cornering. Furthermore, the estimated vehicle speed Vso is differentiated to provide an estimated vehicle acceleration DVso. At Step 105, also calculated is an actual slip rate Sa on the basis of the wheel speed Vw for each wheel and the estimated vehicle speed Vso** (or, the estimated and normalized vehicle speed) which are calculated at Steps 103 and 104, respectively, in accordance with the following equation:

$$Sa^{}=(Vso^{}-Vw^{})/Vso^{}$$

Then, at Step 106, on the basis of the vehicle acceleration DVso and the actual lateral acceleration Gya detected by the lateral acceleration sensor YG, the coefficient of friction $\mu$ against a road surface can be calculated in accordance with the following equation:

$$\mu \approx (DVso^2+Gya^2)^{1/2}$$

In order to detect the coefficient of friction against the road surface, various methods may be employed other than the above method, such as a sensor for directly detecting the coefficient of friction against the road surface.

The program proceeds to Step 107, a vehicle slip angular velocity Dβ (may be called as a vehicle side slip angular velocity) is calculated, and a vehicle slip angle β is calculated at Step 108. This vehicle slip angle β is an angle which corresponds to a vehicle slip against the vehicle's path of travel, which may be called as a vehicle side slip angle, and which can be estimated as follows. That is, at the outset, the vehicle slip angular velocity Dβ, which is a differentiated value dβ/dt of the vehicle slip angle β, is calculated at Step 107 in accordance with the following equation:

$$Dβ=Gy/Vso-γa$$

Then, the vehicle slip angle β is calculated at Step 108 in accordance with the following equation:

$$β=\int(Gya/Vso-γa)dt$$

Then, the program proceeds to Step 109 where the mode for the steering control by braking is made to provide a desired slip rate for use in the steering control by braking, wherein the braking force applied to each wheel is controlled at Step 118 through the hydraulic pressure servo control which will be explained later. The steering control by braking is to be added to each control performed in all the control modes described later. Then, the program proceeds to Step 110, where it is determined whether the condition for initiating the anti-skid control is fulfilled or not. If it is determined that the condition is in the anti-skid control mode, the program proceeds to Step 111, where a control mode performing both the steering control by braking and the anti-skid control start.

If it is determined at Step 110 that the condition for initiating the anti-skid control has not been fulfilled, then the program proceeds to Step 112 where it is determined whether the condition for initiating the front and rear braking force distribution control is fulfilled or not. If it is affirmative at Step 112, the program further proceeds to Step 113 where a control mode for performing both the steering control by braking and the braking force distribution control is performed, otherwise it proceeds to Step 114, where it is determined whether the condition for initiating the traction control is fulfilled or not. If the condition for initiating the traction control is fulfilled, the program proceeds to Step 115 where a control mode for performing both the steering control by braking and the traction control is performed. Otherwise, the program proceeds to Step 116 where it is determined whether the condition for initiating the steering control by braking is fulfilled or not. If the condition for initiating the steering control by braking is fulfilled, the program proceeds to Step 117 where a control mode for performing only the steering control by braking is set. On the basis of the control modes as set in the above, the hydraulic pressure servo control is performed at Step 118, and then the program returns to Step 102. If it is determined at Step 116 that the condition for initiating the steering control by braking has not been fulfilled, the program proceeds to Step 119 where solenoids for all of the solenoid valves are turned off, and then the program returns to Step 102. In accordance with the control modes set at Steps 111, 113, 115 and 117, the sub-throttle opening angle for the throttle control apparatus TH may be adjusted in response to the condition of the vehicle in motion, so that the output of the engine EG could be reduced to limit the driving force produced thereby.

Figure 4:
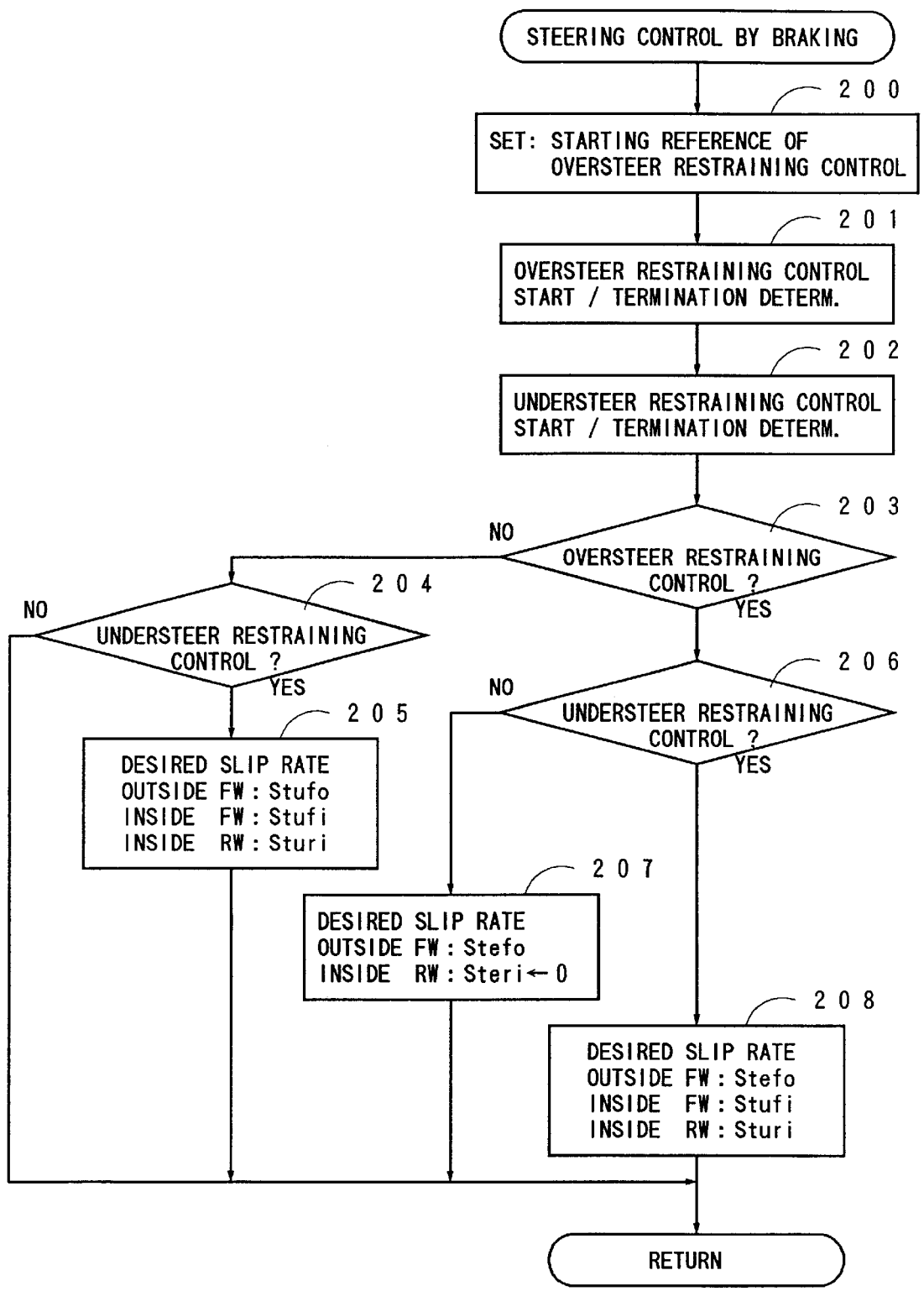
FIG. 4 is a flowchart showing a subroutine for setting a desired slip rate for use in a steering control by braking according to an embodiment of the present invention.
Figure 5:
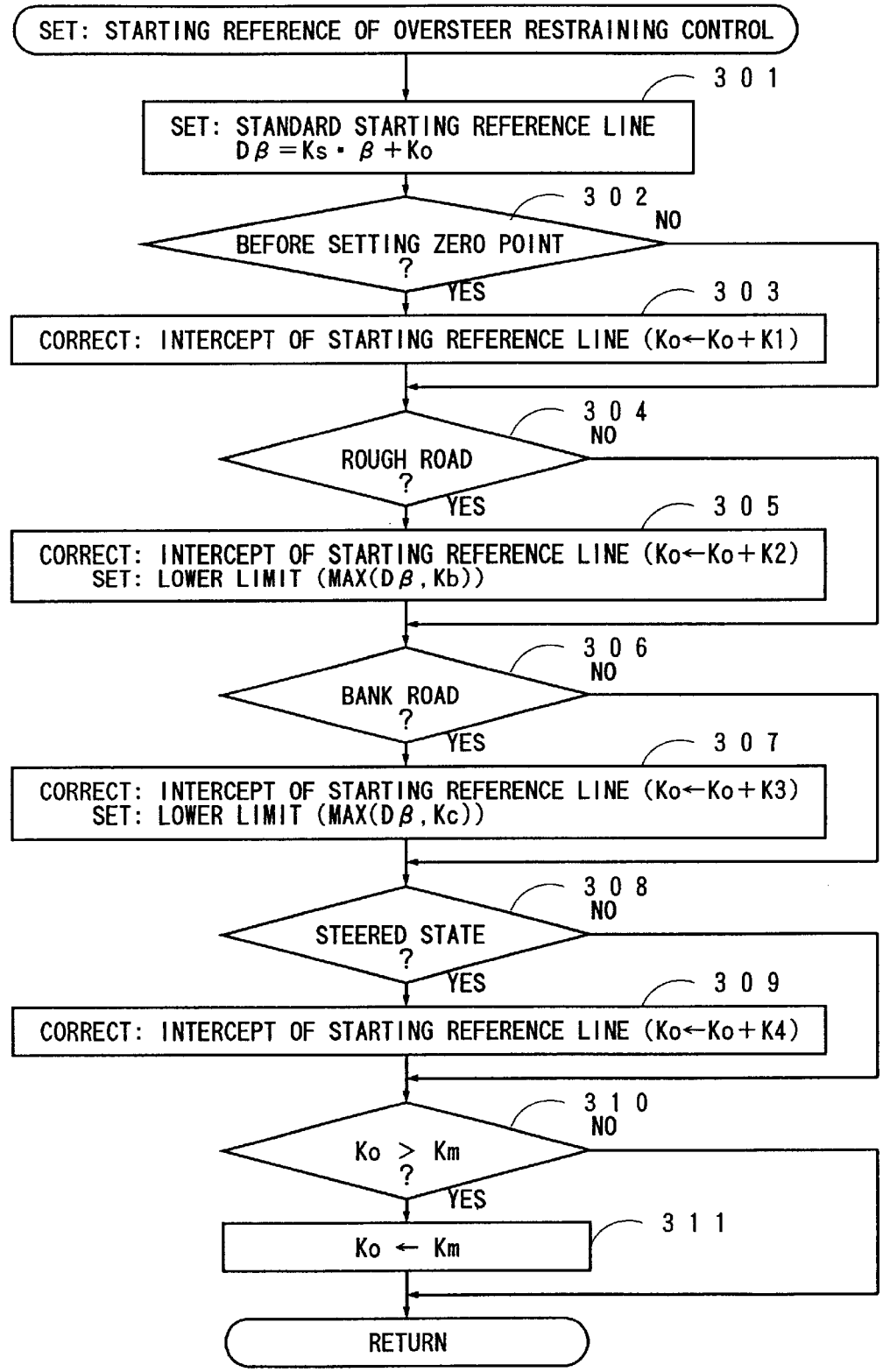
FIG. 5 is a flowchart showing a subroutine for setting a starting reference of oversteer restraining control according to an embodiment of the present invention.
Figure 7:
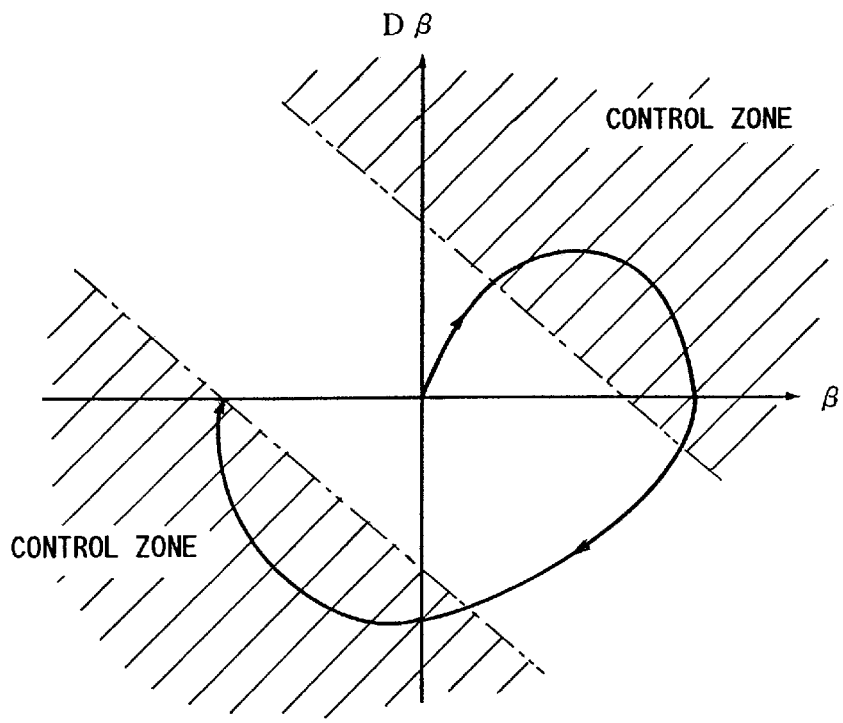
FIG. 7 is a diagram showing a region for determining start and termination of the oversteer restraining control according to an embodiment of the present invention.
Figure 8:
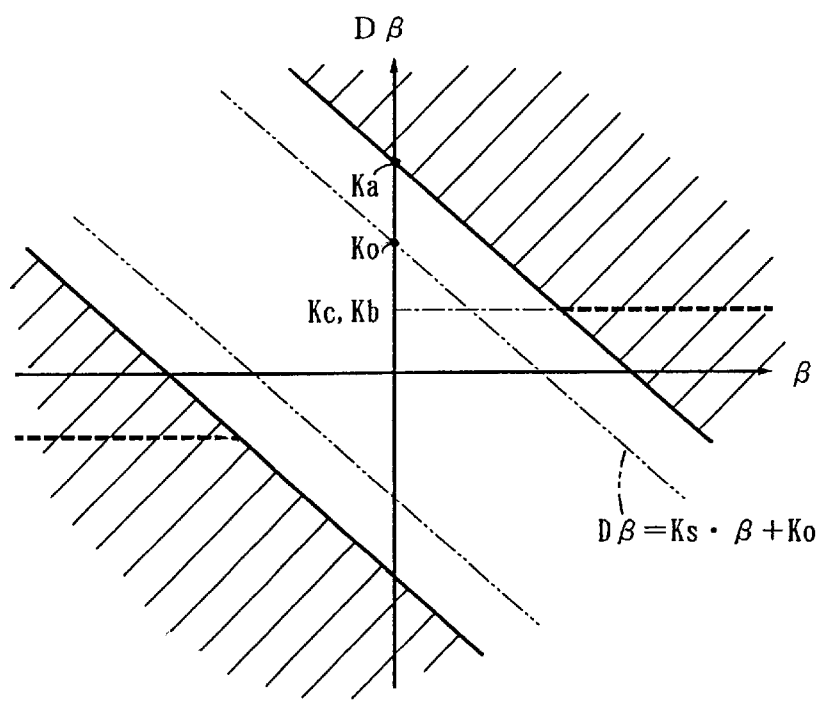
FIG. 8 is a flowchart showing a subroutine for setting a starting reference of oversteer restraining control according to an embodiment of the present invention.

FIG. 4 shows a flowchart for the operation of the steering control by braking performed at Step 109 in FIG. 3, which includes the oversteer restraining control and the understeer restraining control. Through this flowchart, therefore, the desired slip rates are set in accordance with the oversteer restraining control and/or the understeer restraining control. At the outset, a starting reference for the oversteer restraining control is set at Step 200, as will be described later in detail with reference to FIG. 5. Then, it is determined at Step 201 whether the oversteer restraining control is to be started or terminated, and also determined at Step 202 whether the understeer restraining control is to be started or terminated. More specifically, the determination is made at Step 201 on the basis of the determination whether it is within a control zone indicated by hatching on a β-Dβ plane as shown in FIG. 7. That is, if the vehicle slip angle β and the vehicle slip angular velocity D β which are calculated when determining the start or termination, are fallen within the control zone, the oversteer restraining control will be started. However, if the vehicle slip angle β and the vehicle slip angular velocity D β come to be out of the control zone, the oversteer restraining control will be controlled as indicated by the arrow in FIG. 7 thereby to be terminated. Straight lines as indicted by two-dot chain line in FIG. 7 are provided for setting the starting reference of the control, as indicated in FIG. 8, according to the flowchart as shown in FIG. 5 and described later. And, the braking force applied to each wheel is controlled in such a manner that the farther they remote from the straight line of the starting reference toward the control zone, the more the amount to be controlled will be provided.

Figure 9:
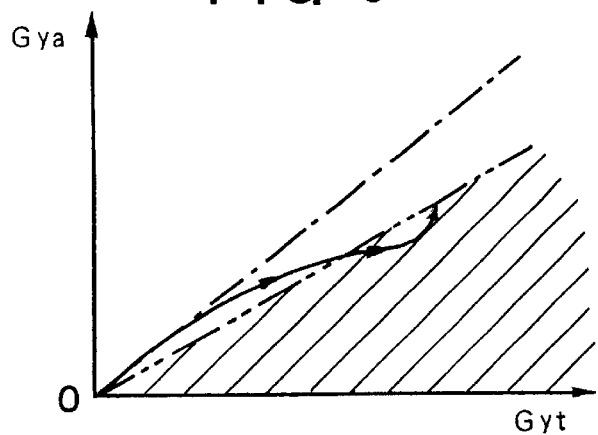
FIG. 9 is a diagram showing a region for determining start and termination of the understeer restraining control according to an embodiment of the present invention.

On the other hand, the determination of the start and termination of the understeer restraining control is made at Step 202 on the basis of the determination whether it is within a control zone indicated by hatching in FIG. 9. That is, in accordance with the variation of the actual lateral acceleration Gya against a desired lateral acceleration Gyt, if they become out of the desired condition as indicated by one dotted chain line, and fallen within the control zone, then the understeer restraining control will be started. If they come to be out of the zone, the understeer restraining control will be controlled as indicated by the arrow in FIG. 9 thereby to be terminated.

Then, the program proceeds to Step 203, where it is determined whether the oversteer restraining control is to be performed or not. If the oversteer restraining control is not to be performed, the program further proceeds to Step 204 where it is determined whether the understeer restraining control Is to be performed or not. In the case where the understeer restraining control is not to be performed, the program returns to the main routine. In the case where it is determined at Step 204 that the understeer restraining control is to be performed, the program proceeds to Step 205 where the desired slip rate of each wheel is set to a desired slip rate which is provided for use in the understeer restraining control. If it is determined at Step 203 that the oversteer restraining control is to be performed, the program proceeds to Step 206 where it is determined whether the understeer restraining control is to be performed or not. In the case where the understeer restraining control is not to be performed, the program proceeds to Step 207 where the desired slip rate of each wheel is set to a desired slip rate which is provided for use in the oversteer restraining control. In the case where it is determined at Step 206 that the understeer restraining control is to be performed, the program proceeds to Step 208 where the desired slip rate of each wheel is set to a desired slip rate which is provided for use in both of the oversteer restraining control and the understeer restraining control.

At Step 205, the desired slip rate of a front wheel located on the outside of the curve of the vehicle's path is set as "Stufo", the desired slip rate of a front wheel located on the inside of the curve is set as "Stufi", and the desired slip rate of a rear wheel located on the inside of the curve is set as "Sturi". As for the slip rate, "t" indicates a desired value, which is comparable with a measured actual value indicated by "a". Then, "u" indicates the understeer restraining control, "f" indicates the front wheel, "r" indicates the rear wheel, "o" indicates the outside of the curve, and "i" indicates the inside of the curve, respectively.

At Step 207, the desired slip rate of the front wheel located on the outside of the curve is set as "Stefo", and the desired slip rate of the rear wheel located on the inside of the curve is set as "Steri", wherein "e" indicates the oversteer restraining control. Whereas, at Step 208, the desired slip rate of the front wheel located on the outside of the curve is set as "Stefo", the desired slip rate of the front wheel located on the inside of the curve is set as "Stufi", and the desired slip rate of the rear wheel located on the inside of the curve is set as "Sturi". That is, when both of the oversteer restraining control and the understeer restraining control are performed simultaneously, the desired slip rate of the front wheel located on the outside of the curve is set to be the same rate as the desired slip rate for use in the oversteer restraining control, while the desired slip rates of the rear wheels are set to be the same rates as the desired slip rates for use in the understeer restraining control. In any cases, however, a rear wheel located on the outside of the curve, i.e., a non-driven wheel of the front drive vehicle is not to be controlled, because this wheel is employed as a reference wheel for use in calculation of the estimated vehicle speed.

With respect to the desired slip rate for use in the oversteer restraining control set at Step 207, the vehicle slip angle β and the vehicle slip angular velocity Dβ are employed. With respect to the desired slip rate for use in the understeer restraining control, a difference between the desired lateral acceleration Gyt and the actual acceleration Gya is employed. The desired slip rates Stefo for use in the oversteer restraining control is calculated in accordance with the following equation:

$$Stefo = K1 \cdot \beta + K2 \cdot D\beta$$

where K1, K2 are constants which are set so as to provide the desired slip rate Stefo which is used for increasing the braking pressure (i.e., increasing the braking force). However, the desired slip rate Steri of the rear wheel located on the inside of the curve is set to be zero.

On the contrary, the desired slip rates Stufo, Sturi for use in the understeer restraining control are calculated in accordance with the following equations, respectively:

$$Stufo = K3 \cdot \Delta Gy$$

$$Sturi = K4 \cdot \Delta Gy$$

$$Stufi = K5 \cdot \Delta Gy$$

where K3 is a constant for providing the desired slip rate Stufo which is used for increasing the braking pressure (or, alternatively decreasing the braking pressure), while K4, K5 are constants for providing the desired slip rate, which are used for increasing the braking pressure.

FIG. 5 shows a subroutine for setting the starting reference of the oversteer restraining control performed at Step 200 in FIG. 4. At the outset, a standard straight line for the starting reference is set at Step 301. On a coordinate with x-axis of the vehicle slip angle β and y-axis of the vehicle slip angular velocity Dβ as shown in FIG. 8, one standard straight line is provided by a straight line with a gradient Ks (negative value) and an intercept Ko, as indicated by a two-dot chain line, so that the standard straight line is represented by the following formula:

$$D\beta = Ks \cdot + Ko$$

As shown in FIG. 8, the other standard line is provided to be symmetrical with the one as indicated above, so that a couple of standard straight lines are set symmetrically about the origin.

Next, the program proceeds to Step 302, where it is determined if a zero point has been set or not. In the case where the zero point has not been set, an error may occur, so that the intercept Ko of the straight line for the starting reference is set to be a value added by a predetermined value K1 to the intercept Ko set for the standard straight line (Ko=Ko +K1). That is, the standard straight line is shifted in parallel upward in FIG. 8 to provide the straight line for the starting reference in this case (the shifted intercept is indicated by "Ka" in FIG. 8). In other words, the starting reference is corrected to be higher than that of the standard case. Then, the program further proceeds to Step 304. If the zero point has already been set, the program jumps to Step 304, where a road condition is determined. For example, on the basis of variation of the wheel speed, it is determined whether the road is rough, or not. When the vehicle travels on a rough road, a distance will be caused between the center of gravity of the vehicle and the center of the lateral acceleration sensor YG mounted on the vehicle. In this case, therefore, it can be estimated that an error should have been included in the signal detected by the lateral acceleration sensor YG. If it is determined that the road is rough, the program proceeds to Step 305, where the intercept of the straight line for the starting reference is corrected, and the lower limit of the vehicle slip angular velocity Dβ is set. That is, the intercept Ko of the straight line for the starting reference is set to be a value added by a predetermined value K2 to the intercept Ko set for the standard straight line (Ko=Ko+K2). At the same time, in order to set the gain to be less sensitive in a range where the vehicle slip angular velocity Dβ is small, i.e., in order to make the starting reference to be higher than that of the standard case, the vehicle slip angular velocity Dβ is calculated in accordance with the following equation:

$$D\beta = MAX(D\beta, Kb)$$

That is, the greater one of the value calculated at that time (=Ks·β+Ko) and the predetermined value Kb for setting the lower limit is selected for the vehicle slip angular velocity Dβ.

If the road is not rough, the program proceeds to Step 306, where it is determined whether the road is a bank road with a constant inclination of the road, or a cant road with an instantaneous inclination of the road (both roads are represented by the bank road, hereinafter). For example, the road is determined to be the bank road, if such a state that a difference between the lateral acceleration Gy(yaw) which was calculated from the yaw rate detected by the yaw rate sensor YS, and the lateral acceleration Gya which was detected by the lateral acceleration sensor YG is greater than a predetermined value, has lasted for more than a predetermined time period. Preferably, the result of dividing the constant time Tk by the estimated vehicle speed Vso (=Tk/Vso) is used for the predetermined time period.

Thus, if it is determined that the road is the bank road, the error is caused in the value detected by the lateral acceleration sensor YG, due to inclination in the right and left direction (lateral direction) of the vehicle. In practice, the error of (g·sinθ) is caused, wherein "g" is a gravity acceleration, and "sinθ" is an inclined angle of the vehicle. Thus, the error of the lateral acceleration sensor YG can be estimated. If it is determined that the road is the bank road, therefore, the program proceeds to Step 307, where the intercept of the straight line for the starting reference is corrected, and the lower limit of the vehicle slip angular velocity Dβ is set. That is, the intercept Ko of the straight line for the starting reference is set to be a value added by a predetermined value K3 to the intercept Ko set for the standard straight line (Ko=Ko+K3). At the same time, the vehicle slip angular velocity Dβ is calculated in accordance with Dβ=MAX(Dβ, Kc), so that the greater value of the value calculated at that time (=Ks·β+Ko) and the predetermined value Kc for setting the lower limit is selected for the vehicle slip angular velocity Dβ. If the road is not the bank road, the program jumps to Step 308.

According to the present embodiment, it is further determined whether the vehicle is under a steered state through a steering operation. For example, the vehicle is determined to be under the steered state, if such a state that a steering angle (θf) which was detected by the front wheel steering angle sensor SSf is greater than a predetermined value, has lasted for more than a predetermined time period. If it is determined that the vehicle is under the steered state, the program proceeds to Step 309, where the intercept Ko of the straight line for the starting reference in the steered direction is set to be a value added by a predetermined value K4 to the intercept Ko set for the standard straight line (Ko=Ko +K4).

Consequently, the intercept Ko is added by all of the predetermined values K1 to K4 at most. At Step 310, however, the intercept Ko is compared with the maximum value Km, and only if it is determined that the intercept Ko is equal to or smaller than the maximum value Km, the program returns to the main routine. If it is determined that the intercept Ko is greater than the maximum value Km, the program proceeds to Step 311, where the intercept Ko is corrected to be the maximum value Km, and then the program returns to the main routine. In other words, a limiting function for setting an upper limit of the intercept Ko is provided. In the present embodiment, it is so arranged that only the starting reference for the oversteer restraining control was corrected, but it may be so arranged that the starting reference for the understeer restraining control is corrected, as well.

Figure 6:
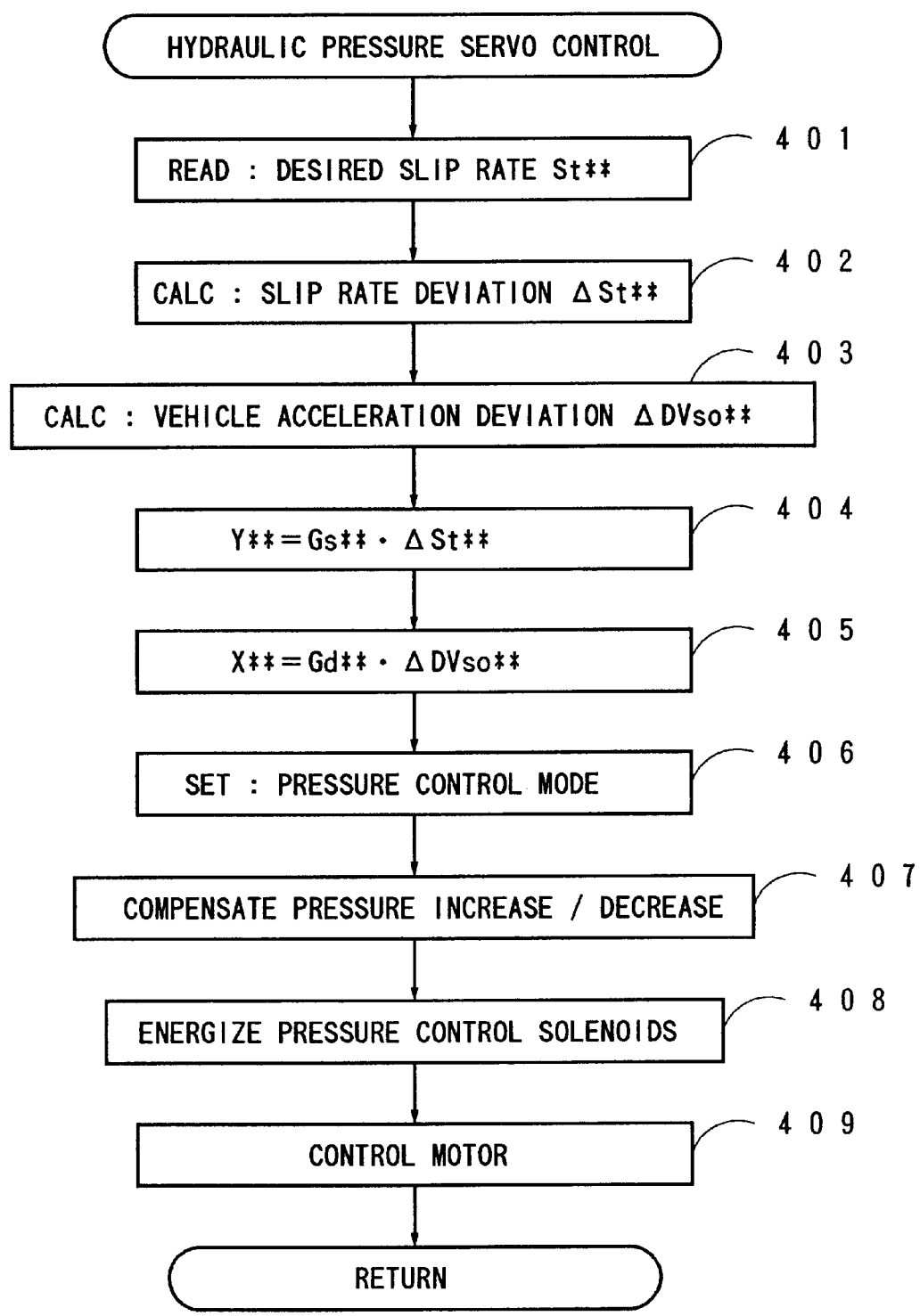
FIG. 6 is a flowchart showing a hydraulic pressure servo control according to an embodiment of the present invention.

FIG. 6 shows the hydraulic pressure servo control which is executed at Step 118 in FIG. 3, and wherein the wheel cylinder pressure for each wheel is controlled through the slip rate servo control. At Step 401, the desired slip rates St, which are set at Step 205, 207 or 208, are read to provide the desired slip rate for each wheel of the vehicle. Then, the program proceeds to Step 402 where a slip rate deviation ΔSt is calculated for each wheel, and further proceeds to Step 403 where a vehicle acceleration deviation ΔDVso is calculated. At Step 402, the difference between the desired slip rate St and the actual slip rate Sa is calculated to provide the slip rate deviation ΔSt (i.e., ΔSt=St−Sa). And, at Step 403, the difference between the estimated vehicle acceleration DVso on the center of gravity of the vehicle and the vehicle acceleration DVw of a selected wheel is calculated to provide the vehicle acceleration deviation $\Delta DVso^{}$. The actual slip rate $Sa^{}$ and the vehicle acceleration deviation $\Delta DVso^{**}$ may be calculated in accordance with a specific manner which is determined in dependence upon the control modes such as the anti-skid control mode, traction control mode or the like, the explanation of which will be omitted.

Figure 10:
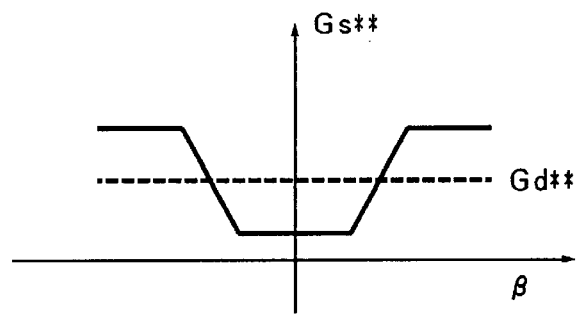
FIG. 10 is a diagram showing a relationship between a vehicle slip angle and a gain for calculating the parameters according to an embodiment of the present invention.
Figure 11:
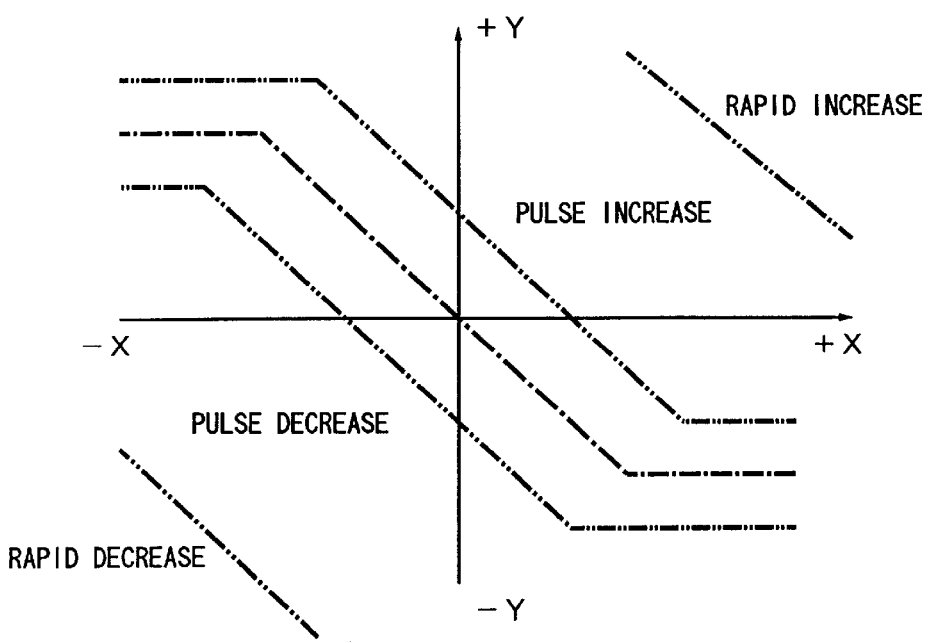
FIG. 11 is a diagram showing a relationship between the pressure control modes and parameters for use in the hydraulic braking pressure control according to an embodiment of the present invention.

Then, the program proceeds to Step 404 where a parameter $Y^{**}$ for providing a hydraulic pressure control in each control mode is calculated in accordance with the following equation:

$$Y^{}=Gs^{}\cdot\Delta St^{**}$$

where "$Gs^{}$" is a gain, which is provided in response to the vehicle slip angle $\beta$ and in accordance with a diagram as shown by a solid line in FIG. 10. The program further proceeds to Step 405 where another parameter $X^{}$ is calculated in accordance with the following equation:

$$X^{}=Gd^{}\cdot\Delta DVso^{**}$$

where "$Gd^{}$" is a gain which is a constant value as shown by a broken line in FIG. 10. On the basis of the parameters $X^{}$ and $Y^{}$, a pressure control mode for each wheel is provided at Step 406, in accordance with a control map as shown in FIG. 11. The control map has a rapid pressure decrease zone, a pulse pressure decrease zone, a pressure hold zone, a pulse pressure increase zone, and a rapid pressure increase zone which are provided in advance as shown in FIG. 11, so that any one of the zones is selected in accordance with the parameters $X^{}$ and $Y^{}$ at Step 406**. In the case where no control mode is performed, no pressure control mode is provided (i.e., solenoids are off).

At Step 407, is performed a pressure increase and decrease compensating control, which is required for smoothing the first transition and last transition of the hydraulic pressure, when the presently selected zone is changed from the previously selected zone at Step 406, e.g., from the pressure increase zone to the pressure decrease zone, or vice versa. When the zone is changed from the rapid pressure decrease zone to the pulse pressure increase zone, for instance, the rapid pressure increase control is performed for a period which is determined on the basis of a period during which the rapid pressure decrease mode, which was provided immediately before the rapid pressure increase control, lasted. Then, the program proceeds to Step 408, where the solenoid PC* of each valve in the hydraulic pressure control apparatus BC (described later with reference to FIG. 12) is energized or de-energized in accordance with the mode determined by the selected pressure control zone or the pressure increase and decrease compensating control thereby to control the braking force applied to each wheel. Then, the program proceeds to Step 409 where the motor M is driven. Although the slip rate is used for the control in the present embodiment, any value corresponding to the braking force applied to each wheel, such as the braking pressure in each wheel brake cylinder, may be employed as the desired value for the oversteer restraining control and/or the understeer restraining control.

FIG. 12 shows the hydraulic braking pressure control apparatus BC according to the present embodiment, which includes a master cylinder MC and a vacuum booster VB which are activated in response to depression of the brake pedal BP. The master cylinder MC is boosted by the vacuum booster VB to pressurize the brake fluid in a low-pressure reservoir LRS and discharge the master cylinder pressure to two hydraulic braking pressure circuits for the wheels FR, RL and the wheels FL, RR, respectively. The master cylinder MC is of a tandem type having two pressure chambers communicated with the two hydraulic braking pressure circuits, respectively. That is, a first pressure chamber is communicated with the hydraulic braking pressure circuit for the wheels FR, RL, and a second pressure chamber is communicated with the hydraulic braking pressure circuit for the wheels FL, RR. At the output side of the master cylinder MC, a pressure sensor PS is provided for detecting its output, i.e., master cylinder pressure.

In the hydraulic braking pressure circuit for the wheels FR, RL, the first pressure chamber is communicated with wheel brake cylinders Wfr, Wrl respectively, through a main passage MF and its branch passages MFr, MFl. A normally open first solenoid valve SC1 (hereinafter, simply referred to a solenoid valve SC1) is disposed in the main passage MF, to act as a so-called cut-off valve. Also, the first pressure chamber is communicated through an auxiliary passage MFc with check valves CV5, CV6, which will be described later. A normally closed second solenoid valve SI1 (hereinafter, simply referred to a solenoid valve SI1) is disposed in the auxiliary passage MFc. Each of the solenoid valves SC1, SI1 is formed by a two-port two-position solenoid operated valve. And, normally open two-port two-position solenoid operated switching valves PC1, PC2 (hereinafter, simply referred to as solenoid valves PC1, PC2) are disposed in the branch passages MFr, MFl, respectively, and in parallel therewith check valves CV1, CV2, respectively.

The check valves CV1, CV2 are provided for allowing the flow of the brake fluid toward the master cylinder MC and preventing the flow toward the wheel brake cylinders Wfr, Wrl. The brake fluid in the wheel brake cylinders Wfr, Wrl is returned to the master cylinder MC, and then to the low-pressure reservoir LRS through the check valves CV1, CV2 and the solenoid valve SC1 placed in its open position as shown in FIG. 12. Accordingly, if the brake pedal BP is released, the hydraulic braking pressure in the wheel brake cylinders Wfr, Wrl is rapidly reduced to the pressure lower than the pressure at the master cylinder MC. And, normally closed two-port two-position solenoid operated switching valves PC5, PC6 (hereinafter, simply referred to as solenoid valves PC5, PC6) are disposed in the branch passages RFr, RFl, respectively, which merge into the drain passage RF connected to the reservoir RS1.

In the hydraulic braking pressure circuit for the wheels FR, RL, the solenoid valves PC1, PC2, PC5, PC6 form a modulator. A hydraulic pressure pump HP1 is disposed in a passage MFp connected to the branch passages MFr, MFl at the upstream of the solenoid valves PC1, PC2, and an outlet of the pressure pump HP1 is connected to the solenoid valves PC1, PC2 through a check valve CV7 and a damper DP1. The pressure pump HP1 and a pressure pump HP2 are driven by a single electric motor M to introduce the brake fluid from the inlets, pressurize the brake fluid to a predetermined pressure, and discharge it from the outlets. The reservoir RS1 is disposed independently from the low-pressure reservoir LRS of the master cylinder MC, and provided with a piston and spring to function as an accumulator for storing a necessary volume of the brake fluid for various controls.

The master cylinder MC is connected to a position between the check valves CV5 and CV6 disposed at the inlet side of the pressure pump HP1 through the passage MF. The check valve CV5 is provided for preventing the flow of the brake fluid toward the reservoir RS1 and allowing the reverse flow. The check valves CV6, CV7 are provided for restricting the flow of the brake fluid discharged from the pressure pump HP1 to a predetermined direction, and normally formed within the pressure pump HP1 in a body. Accordingly, the solenoid valve SI1 is normally placed in the closed position as shown in FIG. 12 where the communication between the master cylinder MC and the inlet of the pressure pump HP1 is blocked, and switched to the open position where the master cylinder MC is communicated with the inlet of the pressure pump HP1.

In parallel with the solenoid valve SC1, is disposed a relief valve RV1 which prevents the brake fluid in the master cylinder MC from flowing toward the solenoid valves PC1, PC2, and allows the brake fluid to flow toward the master cylinder MC when the braking pressure at the solenoid valves PC1, PC2 is greater than the braking pressure at the master cylinder MC by a predetermined pressure difference, and a check valve AV1 which allows the flow of the brake fluid toward the wheel brake cylinders Wfr, Wrl, and prevents its reverse flow. The relief valve RV1 is provided for returning the brake fluid to the low-pressure reservoir LRS through the master cylinder MC when the pressurized braking pressure discharged from the pressure pump HP1 is greater than the braking pressure discharged from the master cylinder MC by the predetermined pressure difference, thereby to modulate the brake fluid discharged from the pressure pump HP1 into a predetermined pressure. The damper DP1 is disposed at the outlet side of the pressure pump HP1, and a proportioning valve PV1 is disposed in a passage connected to the rear wheel brake cylinder Wrl.

In the hydraulic braking pressure circuit for the wheels FL, RR, are disposed a reservoir RS2, damper DP2, proportioning valve PV2, normally open two-port two-position solenoid operated switching valve SC2, normally closed two-port two-position solenoid operated switching valve SI2, PC7, PC8, normally open two-port two-position solenoid operated switching valves PC3, PC4, check valves CV3, CV4, CV8-CV10, relief valve RV2, and check valve AV2. The pressure pump HP2 is driven by the electric motor M together with the pressure pump HP1. Both of the pumps HP1 and HP2 will be driven continuously after the motor M starts to operate them.

The solenoid valves SC1, SC2, SI1, SI2 and solenoid valves PC1-PC8 are controlled by the electronic controller ECU to perform various controls such as the steering control by braking, and etc. For example, when it is determined that the excessive oversteer occurs during cornering, it is necessary to produce a moment for overcoming the excessive oversteer. When the excessive oversteer, for example, is needed to be prevented in case of the steering control by braking, the moment for overcoming the excessive oversteer a must be created. In this case, it is effective to apply the braking force only to a certain single wheel. That is, with respect to the hydraulic braking pressure circuit for the wheels FR, RL, the solenoid valve SC1 is placed in its closed position, and the solenoid valve SI1 is placed in its open position, and the motor M is driven, so that the pressure pump HP1 is actuated to discharge the pressurized brake fluid therefrom. Then, with the solenoid valves PC1, PC2, PC5, PC6 energized and de-energized alternately, the hydraulic pressure in each of the wheel braking cylinders Wfr, Wrl is gradually increased, decreased or held. Consequently, the braking force distribution between the front and rear wheels is controlled to keep the course trace performance of the vehicle.

It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. A vehicle motion control system for maintaining stability of an automotive vehicle when said vehicle in motion, comprising:

a hydraulic braking pressure control apparatus for controlling braking force applied to each wheel of said vehicle at least in response to depression of a brake pedal;

vehicle condition monitor means disposed in said vehicle for monitoring a condition of said vehicle in motion;

vehicle condition determining means for determining stability of said vehicle in motion, including a turning motion of said vehicle on the basis of the output of said monitor means;

braking force control means for controlling said hydraulic braking pressure control apparatus in response to the result of determination of said vehicle condition determining means to control the braking force applied to each wheel of said vehicle;

starting reference setting means for setting a starting reference to start the braking force control by said braking force control means in response to the result of determination of said vehicle condition determining means;

error estimating means for estimating an error caused by said monitor means; and correction means for correcting the starting reference set by said starting reference setting means in response to the error estimated by said error estimating means;

wherein said correction means is adapted to correct the starting reference set by said starting reference setting means to be relatively higher, when said error estimating means estimated the error resulted from a distance between the center of gravity of said vehicle and the center of said monitor means mounted on said vehicle.

2. The vehicle motion control system of claim 1, wherein said vehicle condition monitor means includes vehicle speed detecting means for detecting a vehicle speed, a lateral acceleration detecting means for detecting a lateral acceleration of said vehicle, and a yaw rate detecting means for detecting a yaw rate of said vehicle.

3. The vehicle motion control system of claim 2, wherein said vehicle condition monitor means includes vehicle slip angular velocity calculating means for calculating a vehicle slip angular velocity on the basis of the vehicle speed detected by said vehicle speed detecting means, the lateral acceleration detected by said lateral acceleration detecting means, and the yaw rate detected by said yaw rate detecting means, and includes vehicle slip angle calculating means for integrating the vehicle slip angular velocity to obtain a vehicle slip angle, and wherein said starting reference setting means is adapted to set the starting reference in response to the result calculated by said vehicle slip angular velocity calculating means, and the result calculated by said vehicle slip angle calculating means.

4. A vehicle motion control system for maintaining stability of an automotive vehicle when said vehicle in motion, comprising:

a hydraulic braking pressure control apparatus for controlling braking force applied to each wheel of said vehicle at least in response to depression of a brake pedal;

vehicle condition monitor means disposed in said vehicle for monitoring a condition of said vehicle in motion;

vehicle condition determining means for determining stability of said vehicle in motion, including a turning motion of said vehicle on the basis of the output of said monitor means;

braking force control means for controlling said hydraulic braking pressure control apparatus in response to the result of determination of said vehicle condition determining means to control the braking force applied to each wheel of said vehicle;

starting reference setting means for setting a starting reference to start the braking force control by said braking force control means in response to the result of determination of said vehicle condition determining means;

error estimating means for estimating an error caused by said monitor means; and correction means for correcting the starting reference set by said starting reference setting means in response to the error estimated by said error estimating means;

wherein said correction means is adapted to correct the starting reference set by said starting reference setting means to be relatively higher, when said error estimating means estimated the error resulted from a zero point set for said monitor means.

5. The vehicle motion control system of claim 4, wherein said vehicle condition monitor means includes vehicle speed detecting means for detecting a vehicle speed, a lateral acceleration detecting means for detecting a lateral acceleration of said vehicle, and a yaw rate detecting means for detecting a yaw rate of said vehicle.

6. The vehicle motion control system of claim 5, wherein said vehicle condition monitor means includes vehicle slip angular velocity calculating means for calculating a vehicle slip angular velocity on the basis of the vehicle speed detected by said vehicle speed detecting means, the lateral acceleration detected by said lateral acceleration detecting means, and the yaw rate detected by said yaw rate detecting means, and includes vehicle slip angle calculating means for integrating the vehicle slip angular velocity to obtain a vehicle slip angle, and wherein said starting reference setting means is adapted to set the starting reference in response to the result calculated by said vehicle slip angular velocity calculating means, and the result calculated by said vehicle slip angle calculating means.

7. A vehicle motion control system for maintaining stability of an automotive vehicle when said vehicle in motion, comprising:

a hydraulic braking pressure control apparatus for controlling braking force applied to each wheel of said vehicle at least in response to depression of a brake pedal;

vehicle condition monitor means disposed in said vehicle for monitoring a condition of said vehicle in motion;

vehicle condition determining means for determining stability of said vehicle in motion, including a turning motion of said vehicle on the basis of the output of said monitor means;

braking force control means for controlling said hydraulic braking pressure control apparatus in response to the result of determination of said vehicle condition determining means to control the braking force applied to each wheel of said vehicle;

starting reference setting means for setting a starting reference to start the braking force control by said braking force control means in response to the result of determination of said vehicle condition determining means;

error estimating means for estimating an error caused by said monitor means; and correction means for correcting the starting reference set by said starting reference setting means in response to the error estimated by said error estimating means;

wherein said correction means is adapted to correct the starting reference set by said starting reference setting means to be relatively higher, when said error estimating means estimated the error resulted from inclination of said vehicle in a lateral direction thereof.

8. The vehicle motion control system of claim 7, wherein said vehicle condition monitor means includes vehicle speed detecting means for detecting a vehicle speed, a lateral acceleration detecting means for detecting a lateral acceleration of said vehicle, and a yaw rate detecting means for detecting a yaw rate of said vehicle.

9. The vehicle motion control system of claim 8, wherein said vehicle condition monitor means includes vehicle slip angular velocity calculating means for calculating a vehicle slip angular velocity on the basis of the vehicle speed detected by said vehicle speed detecting means, the lateral acceleration detected by said lateral acceleration detecting means, and the yaw rate detected by said yaw rate detecting means, and includes vehicle slip angle calculating means for integrating the vehicle slip angular velocity to obtain a vehicle slip angle, and wherein said starting reference setting means is adapted to set the starting reference in response to the result calculated by said vehicle slip angular velocity calculating means, and the result calculated by said vehicle slip angle calculating means.

* * * * *